(12) United States Patent
Meyerzon et al.

(10) Patent No.: US 7,599,917 B2
(45) Date of Patent: Oct. 6, 2009

(54) RANKING SEARCH RESULTS USING BIASED CLICK DISTANCE

(75) Inventors: Dmitriy Meyerzon, Bellevue, WA (US); Hugo Zaragoza, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 605 days.

(21) Appl. No.: 11/206,286

(22) Filed: Aug. 15, 2005

(65) Prior Publication Data

US 2007/0038622 A1 Feb. 15, 2007

(51) Int. Cl.
*G06F 17/30* (2006.01)

(52) U.S. Cl. ..................... 707/3; 707/5; 707/7

(58) Field of Classification Search ................. 707/102, 707/3, 5, 204, 7, 104.1; 715/501.1; 709/221
See application file for complete search history.

(56) References Cited

U.S. PATENT DOCUMENTS

| | | | |
|---|---|---|---|
| 5,222,236 A | 6/1993 | Potash et al. |
| 5,257,577 A | 11/1993 | Clark |
| 5,594,660 A | 1/1997 | Sung et al. |
| 5,606,609 A | 2/1997 | Houser et al. |
| 5,848,404 A | 12/1998 | Hafner et al. |
| 5,893,092 A | 4/1999 | Driscoll |
| 5,920,859 A | 7/1999 | Li |
| 5,933,851 A | 8/1999 | Kojima |
| 5,960,383 A | 9/1999 | Fleischer |
| 5,983,216 A | 11/1999 | Kirsch et al. |
| 5,987,457 A | 11/1999 | Ballard |
| 6,006,225 A | 12/1999 | Bowman et al. |
| 6,012,053 A | 1/2000 | Pant et al. |
| 6,032,196 A | 2/2000 | Monier |
| 6,041,323 A | 3/2000 | Kubota |
| 6,070,158 A | 5/2000 | Kirsch et al. |
| 6,070,191 A | 5/2000 | Narendran et al. |
| 6,098,064 A | 8/2000 | Pirolli et al. |
| 6,125,361 A | 9/2000 | Chakrabarti et al. |
| 6,128,701 A | 10/2000 | Malcolm et al. |
| 6,145,003 A | 11/2000 | Sanu et al. |
| 6,151,624 A | 11/2000 | Teare et al. |
| 6,167,369 A | 12/2000 | Schulze |

(Continued)

FOREIGN PATENT DOCUMENTS

DE    10029644 A1    1/2002

(Continued)

OTHER PUBLICATIONS

Barry Smyth, Relevance at a Distance—An Investigation of Distance-Biased Personalization on the Mobile Internet, pp. 1-6.*

(Continued)

*Primary Examiner*—John R. Cottingham
*Assistant Examiner*—Sherief Badawi
(74) *Attorney, Agent, or Firm*—Merchant & Gould P.C.

(57) ABSTRACT

Methods of providing a document relevance score to a document on a network are disclosed. Computer readable medium having stored thereon computer-executable instructions for performing a method of providing a document relevance score to a document on a network are also disclosed. Further, computing systems containing at least one application module, wherein the at least one application module comprises application code for performing methods of providing a document relevance score to a document on a network are disclosed.

14 Claims, 8 Drawing Sheets

U.S. PATENT DOCUMENTS

| | | |
|---|---|---|
| 6,182,085 B1 | 1/2001 | Eichstaedt et al. |
| 6,182,113 B1 | 1/2001 | Narayanaswami |
| 6,185,558 B1 | 2/2001 | Bowman et al. |
| 6,202,058 B1 | 3/2001 | Rose et al. |
| 6,208,988 B1 | 3/2001 | Schultz |
| 6,222,559 B1 | 4/2001 | Asano et al. |
| 6,240,407 B1 | 5/2001 | Chang et al. |
| 6,240,408 B1 | 5/2001 | Kaufman |
| 6,247,013 B1 | 6/2001 | Morimoto |
| 6,263,364 B1 | 7/2001 | Najork et al. |
| 6,285,367 B1 | 9/2001 | Abrams et al. |
| 6,285,999 B1 * | 9/2001 | Page ............................ 707/5 |
| 6,304,864 B1 | 10/2001 | Liddy et al. |
| 6,317,741 B1 | 11/2001 | Burrows |
| 6,327,590 B1 | 12/2001 | Chidlovskii |
| 6,349,308 B1 | 2/2002 | Whang et al. |
| 6,351,467 B1 | 2/2002 | Dillon |
| 6,351,755 B1 | 2/2002 | Najork et al. |
| 6,360,215 B1 | 3/2002 | Judd et al. |
| 6,385,602 B1 | 5/2002 | Tso et al. |
| 6,389,436 B1 | 5/2002 | Chakrabarti et al. |
| 6,418,433 B1 | 7/2002 | Chakrabarti et al. |
| 6,418,452 B1 | 7/2002 | Kraft et al. |
| 6,418,453 B1 | 7/2002 | Kraft et al. |
| 6,442,606 B1 | 8/2002 | Subbaroyan et al. |
| 6,484,204 B1 | 11/2002 | Rabinovich |
| 6,516,312 B1 | 2/2003 | Kraft et al. |
| 6,539,376 B1 | 3/2003 | Sundaresan et al. |
| 6,546,388 B1 | 4/2003 | Edlund et al. |
| 6,547,829 B1 | 4/2003 | Meyerzon et al. |
| 6,549,897 B1 | 4/2003 | Katariya et al. |
| 6,594,682 B2 | 7/2003 | Peterson et al. |
| 6,598,047 B1 | 7/2003 | Russell et al. |
| 6,598,051 B1 | 7/2003 | Wiener et al. |
| 6,601,075 B1 | 7/2003 | Huang et al. |
| 6,622,140 B1 | 9/2003 | Kantrowitz |
| 6,628,304 B2 | 9/2003 | Mitchell et al. |
| 6,633,867 B1 | 10/2003 | Kraft et al. |
| 6,633,868 B1 | 10/2003 | Min |
| 6,636,853 B1 | 10/2003 | Stephens, Jr. |
| 6,638,314 B1 | 10/2003 | Meyerzon et al. |
| 6,671,683 B2 | 12/2003 | Kanno |
| 6,701,318 B2 | 3/2004 | Fox et al. |
| 6,718,324 B2 | 4/2004 | Edlund et al. |
| 6,718,365 B1 * | 4/2004 | Dutta ........................ 709/203 |
| 6,738,764 B2 | 5/2004 | Mao et al. |
| 6,763,362 B2 | 7/2004 | McKeeth |
| 6,766,316 B2 | 7/2004 | Caudill et al. |
| 6,766,422 B2 | 7/2004 | Beyda |
| 6,775,659 B2 | 8/2004 | Clifton-Bligh |
| 6,775,664 B2 | 8/2004 | Lang et al. |
| 6,778,997 B2 * | 8/2004 | Sundaresan et al. ...... 707/104.1 |
| 6,829,606 B2 | 12/2004 | Ripley |
| 6,862,710 B1 | 3/2005 | Marchisio |
| 6,871,202 B2 | 3/2005 | Broder |
| 6,883,135 B1 | 4/2005 | Obata et al. |
| 6,886,010 B2 | 4/2005 | Kostoff |
| 6,886,129 B1 | 4/2005 | Raghavan et al. |
| 6,910,029 B1 | 6/2005 | Sundaresan |
| 6,931,397 B1 | 8/2005 | Sundaresan |
| 6,934,714 B2 | 8/2005 | Meinig |
| 6,944,609 B2 | 9/2005 | Witbrock |
| 6,947,930 B2 | 9/2005 | Anick et al. |
| 6,959,326 B1 | 10/2005 | Day et al. |
| 6,973,490 B1 | 12/2005 | Robertson et al. |
| 6,990,628 B1 | 1/2006 | Palmer et al. |
| 7,016,540 B1 | 3/2006 | Gong et al. |
| 7,028,029 B2 | 4/2006 | Kamvar et al. |
| 7,051,023 B2 | 5/2006 | Kapur et al. |
| 7,072,888 B1 | 7/2006 | Perkins |
| 7,076,483 B2 | 7/2006 | Preda et al. |
| 7,080,073 B1 | 7/2006 | Jiang et al. |
| 7,107,218 B1 | 9/2006 | Preston |
| 7,152,059 B2 | 12/2006 | Monteverde |
| 7,181,438 B1 | 2/2007 | Szabo |
| 7,197,497 B2 | 3/2007 | Cossock |
| 7,228,301 B2 * | 6/2007 | Meyerzon et al. .............. 707/3 |
| 7,243,102 B1 | 7/2007 | Naam et al. |
| 7,246,128 B2 | 7/2007 | Jordahl |
| 7,257,577 B2 | 8/2007 | Fagin et al. |
| 7,260,573 B1 | 8/2007 | Jeh et al. |
| 7,281,002 B2 | 10/2007 | Farrell |
| 7,308,643 B1 | 12/2007 | Zhu et al. |
| 7,328,401 B2 | 2/2008 | Obata et al. |
| 7,356,530 B2 | 4/2008 | Kim et al. |
| 7,428,530 B2 | 9/2008 | Ramaranthnam et al. |
| 2001/0042076 A1 | 11/2001 | Fukuda |
| 2002/0055940 A1 | 5/2002 | Elkan |
| 2002/0062323 A1 * | 5/2002 | Takatori et al. ............. 707/514 |
| 2002/0078045 A1 | 6/2002 | Dutta |
| 2002/0099694 A1 | 7/2002 | Diamond et al. |
| 2002/0103798 A1 | 8/2002 | Abrol et al. |
| 2002/0107861 A1 | 8/2002 | Clendinning et al. |
| 2002/0107886 A1 | 8/2002 | Gentner et al. |
| 2002/0129014 A1 | 9/2002 | Kim et al. |
| 2002/0169595 A1 | 11/2002 | Agichtein et al. |
| 2002/0169770 A1 | 11/2002 | Kim et al. |
| 2003/0037074 A1 | 2/2003 | Dwork et al. |
| 2003/0061201 A1 | 3/2003 | Grefenstette et al. |
| 2003/0065706 A1 | 4/2003 | Smyth et al. |
| 2003/0074368 A1 | 4/2003 | Schuetze et al. |
| 2003/0208482 A1 | 11/2003 | Kim et al. |
| 2003/0217047 A1 | 11/2003 | Marchisio |
| 2003/0217052 A1 | 11/2003 | Rubenczyk et al. |
| 2004/0006559 A1 * | 1/2004 | Gange et al. .................... 707/3 |
| 2004/0049766 A1 | 3/2004 | Bloch et al. |
| 2004/0093328 A1 | 5/2004 | Damle |
| 2004/0117351 A1 | 6/2004 | Challapalli et al. |
| 2004/0148278 A1 | 7/2004 | Milo et al. |
| 2004/0181515 A1 | 9/2004 | Ullman et al. |
| 2004/0186827 A1 | 9/2004 | Anick et al. |
| 2004/0194099 A1 | 9/2004 | Lamping et al. |
| 2004/0199497 A1 | 10/2004 | Timmons |
| 2004/0205497 A1 | 10/2004 | Alexander et al. |
| 2004/0215606 A1 | 10/2004 | Cossock |
| 2004/0215664 A1 | 10/2004 | Hennings et al. |
| 2004/0254932 A1 | 12/2004 | Gupta et al. |
| 2005/0033742 A1 | 2/2005 | Kamvar et al. |
| 2005/0044071 A1 | 2/2005 | Cho et al. |
| 2005/0055340 A1 | 3/2005 | Dresden |
| 2005/0055347 A9 | 3/2005 | Cho et al. |
| 2005/0060311 A1 | 3/2005 | Tong et al. |
| 2005/0071328 A1 | 3/2005 | Lawrence |
| 2005/0071741 A1 | 3/2005 | Acharya et al. |
| 2005/0086192 A1 | 4/2005 | Kodama |
| 2005/0086206 A1 | 4/2005 | Balasubramanian |
| 2005/0086583 A1 | 4/2005 | Obata et al. |
| 2005/0144162 A1 | 6/2005 | Liang |
| 2005/0154746 A1 | 7/2005 | Liu et al. |
| 2005/0165781 A1 | 7/2005 | Kraft et al. |
| 2005/0187965 A1 | 8/2005 | Abajian |
| 2005/0192936 A1 | 9/2005 | Meek et al. |
| 2005/0192955 A1 | 9/2005 | Farrell |
| 2005/0210006 A1 | 9/2005 | Robertson |
| 2005/0216533 A1 * | 9/2005 | Berkhin ...................... 707/204 |
| 2005/0240580 A1 | 10/2005 | Zamir et al. |
| 2005/0251499 A1 | 11/2005 | Huang |
| 2005/0262050 A1 * | 11/2005 | Fagin et al. .................... 707/3 |
| 2006/0036598 A1 | 2/2006 | Wu |
| 2006/0047649 A1 | 3/2006 | Liang |
| 2006/0069982 A1 * | 3/2006 | Petriuc ........................ 715/500 |
| 2006/0074871 A1 | 4/2006 | Meyerzon et al. |
| 2006/0074903 A1 | 4/2006 | Meyerzon et al. |
| 2006/0136411 A1 | 6/2006 | Meyerzon et al. |

| | | | |
|---|---|---|---|
| 2006/0173560 | A1 | 8/2006 | Widrow |
| 2006/0195440 | A1 | 8/2006 | Burges et al. |
| 2006/0200460 | A1 | 9/2006 | Meyerzon et al. |
| 2006/0206460 | A1 | 9/2006 | Gadkari et al. |
| 2006/0206476 | A1 | 9/2006 | Kapur et al. |
| 2006/0282455 | A1* | 12/2006 | Lee et al. .................... 707/102 |
| 2006/0287993 | A1 | 12/2006 | Yao et al. |
| 2006/0294100 | A1 | 12/2006 | Meyerzon et al. |
| 2007/0038616 | A1 | 2/2007 | Guha |
| 2007/0073748 | A1 | 3/2007 | Barney |
| 2007/0106659 | A1 | 5/2007 | Lu et al. |
| 2007/0150473 | A1 | 6/2007 | Li et al. |

FOREIGN PATENT DOCUMENTS

| | | | |
|---|---|---|---|
| EP | | 1050830 A2 | 11/2000 |
| EP | | 1120717 A2 | 8/2001 |
| EP | | 1282060 A2 | 2/2002 |
| EP | | 1557770 A1 | 7/2005 |
| JP | | 10091638 | 4/1998 |
| JP | | 11328191 | 11/1999 |
| KR | 10-2002-0015838 A | | 3/2002 |
| KR | 10-2003-0081209 A | | 10/2003 |
| KR | 10-2006-0116042 A | | 11/2006 |
| WO | | 0 950 961 | 10/1999 |

OTHER PUBLICATIONS

Sylvain Senecal, Consumers' decision-making process and their online shopping behavior: a clickstream analysis, Jun. 1, 2004, pp. 1600-1607.*

Ronald Fagin, Searching the Workplace Web, Mar. 3, 2005, pp. 1-10.*

JI-Rong Wen, Query Clustering using user Logs, Jan. 2002, pp. 59-81.*

International Search Report for Application No. PCT/US2006/031965 of Jan. 11, 2007, 3 pages.

"Managing External Content in Microsoft Office SharePoint Portal Server 2003", http://www.microsoft.com/technet/prodtechnol/sppt/reskit/c226188x.mspx, published on Jun. 9, 2004, printed on May 22, 2006, 20 pages.

"Microsoft Full-Text Search Technologies", http://www.microsoft.com/technet/prodtechnol/sppt/sharepoint/evaluate/featfunc/mssearc...., published on Jun. 1, 2001, printed on May 22, 2006, 13 pages.

"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pages.

"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pages.

"SharePoint Portal Server 2001 Planning and Installation Guide", http://www.microsoft.com/technet/prodtechnol/sppt/sharepoint/plan/planinst.mspx, printed on May 22, 2006, 86 pages.

Agichten et al., "Improving Web Search Ranking by Incorporating User Behavior Information"—http://www.mathes.emory.edu/~eugene/papers/sigir2006ranking.pdf, 8 pages.

Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, 32 pages.

Brin, S. et al., "The Anatomy of a Large-Scale Hypertextual Web Search Engine", In Proceedings of the 7th International World Wide Web Conference, Brisbane, Australia, pp. 107-117, 1998.

Burges, Christopher J.C. et al. "Learning to Rank with Nonsmooth Cost Functions"—http://books.nips.cc/papers/txt/nips19/NIPS2006_0574.txt, 8 pages.

Carmel, D. et al., "Searching XML Documents Via XML Fragments", SIGIR Toronto, Canada, Jul.-Aug. 2003, pp. 151-158.

Chakrabarti, S., "Recent Results in Automatic Web Resource Discovery", ACM Computing Surveys, vol. 31, No. 4es, Dec. 1999, 9 pages.

Chen, Michael et al., Cha-Cha: A System for Organizing Intranet Search Results, Computer Science Department, University of California, Berkeley, 1999, pp. 1-12.

Cho et al., "Efficient Crawling Through URL Ordering", In Proceedings of the 7th International World Wide Web Conference, Apr. 1998, pp. 161-180.

Craswell, N. et al., "TREC12 Web Track as CSIRO", TREC 12, Nov. 2003, 11 pages.

Cutler, M. et al., "A New Study on Using HTML Structures to Improve Retrieval", 11th IEEE International Conference on Chicago, IL, Nov. 9-11, 1999, pp. 406-409.

Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pages.

Fagin, R. et al., "Searching the Workplace Web", May 20, 2003, Retrieved from the Internet: www.almaden.ibm.com/cs/people/fagin/www03.pdf.

Fagin, R. et al., "Searching the Workplace Web", IBM Almaden Research Center, In Proceedings of the Twelfth International World Wide Web Conference, Budapest, 2003, 21 pages.

Hawking, D. et al., "Overview of the TREC-8 Web Track", TREC, Feb. 2000, pp. 1-18.

Hawking, D., "Overview of the TREC-9 Track", TREC, 2000, pp. 1-16.

Hawking., D. et al., "Overview of TREC-7 Very Large Collection Track", TREC, Jan. 1999, pp. 1-13.

Heery, Rachel, "Review of Metafata Formats", Program, vol. 30, No. 4, Oct. 1996, 1996 IEEE, pp. 345-373.

Hiemstra, D. et al., "Relevance Feedback for Best MatchTerm Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.

Huang et al., "Design and Implementation of a Chinese Full-Text Retrieval System Based on Probabilistic Model", IEEE, 1993, pp. 1090-1093.

Jones, K. et al., "A probabilistic model of information retrieval: development and status", Department of Information Science, City University, London, Aug. 1998, 76 pages.

Kotsakis, E., "Structured Information Retrieval in XML Documents", Proceedings of the ACM Symposium of Applied Computing, Madrid, Spain, 2002, pp. 663-667.

Kucuk, Mehmet Emin, et al., "Application of Metadata Concepts to Discovery of Internet Resources", ADVIS 2000, INCS 1909, pp. 304-313, 2000.

Lalmas, M., "Uniform Representation of Content and Structure for Structured Document Retrival", $20^{th}$ SGES International Conference on Knowledge Based Systems and Applied Artificial Intelligence, Cambridge, UK, Dec. 2000, pp. 1-12.

Lam et al., "Automatic Document Classification Based on Probabilistic Reasoning: Model and Performance Analysis", IEEE, 1997, pp. 2719-2723.

Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.

Lee, J.K.W. et al., "Intelligent Agents for Matching Information Providers and Consumers on the World-Wide Web", IEEE, 1997, pp. 189-199.

Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.

Losee, R. et al., "Research in Information Organization", Literature Review, School of Information and Library Science, Section 4, pp. 53-96, Jan. 2001.

Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.

Manning, C. et al., "CS276A Text Information Retrieval, Mining, and Exploitation: Lecture 12" Stanford University CS276A/

SYMBSYS2391/LING2391 Test Information Retrieval, Mining, and Exploitation, Fall 2002, last modified Nov. 18, 2002, 8 pages.

Matveeva, Irina et al., "High Accuracy Retrieval with Multiple Nested Ranker," http://people.cs.uchicago.edu/~matveeva/RankerSIGIR06.pdf, SIGIR'06, Seattle, WA Aug. 6-11, 2006, 8 pages.

Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.

MSDN, "Understanding Ranking," http://msdn.microsoft.com/en-us/library/ms142524.aspx, Sep. 2007, 4 pages.

Najork, Marc et al., Breadth-First Crawling Yields High-Quality Pages, ACM, Compaq Systems Research Center, Hong Kong, 2001, pp. 114-118.

Nelson, Chris, "Use of Metadata Registries for Searching for Statistical Data", IEEE 2002, Dimension EDI Ltd., pp. 232-235, 2002.

Numerico, T., "Search engines organization of information and Web Topology", http://www.cafm.lsbu.ac.uk/eminars/sse/numerico-6-dec-2004.pdf, Dec. 6, 2004, 32 pages.

Ogilvie, P. et al., "Combining Document Representations for Known-Item Search", Proceedings of the 26th Annual International ACM SIGIR Conference on Research and Development in Information Retrieval, Toronto, Canada, 2003, pp. 143-150.

Radlinski, et al., "Query Chains: Learning to Rank from Implicit Feedback," http://delivery.acm.org/10.1145/1090000/1081899/p239-radlinski.pdf?key1=1081899&key2=3628533811&coll=GUIDE&CFID=27212902&CFTOKEN=53118399, KDD'05, Chicago, IL, Aug. 21-24, 2005, 10 pages.

Robertson, S. et al., "Okapi at TREC-4", 1996, 24 pages.

Robertson, S. et al., "Some Simple Effective Approximations to the 2-Poisson Model for Probabilistic Weighted Retrieval", Proceedings of the 17th Annual International ACM SIGIR Conference on Research and Development in Information Retrieval, 1994, pp. 232-241.

Schulz, Stefan, et al., "Indexing Medical WWW Documents by Morphemes", MEDINFO 2001 Proceedings of the 10th World Congress on Medical Informatics, Park I, IOS Press, Inc., pp. 266-270, 2001.

Shamsfard, Mehrnoush, et al., "ORank: An Ontology Based System for Ranking Documents," http://www.waste.org/ijcs/v1/v1-3-30.pdf, International Journal of Computer Science, vol. 1, No. 3, Apr. 10, 2006, pp. 225-231.

Singhal, A. et al., "AT&T at TREC-9", Proceedings of the Ninth Text Retrieval Conference, NIST Special Publication 500-249, 'Online! 2001, pp. 103-105.

Sturdy, Derek, "Squirrels, and nuts: metadata and knowledge management", Business Information Review, 18(4), pp. 34-42, Dec. 2001.

Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&d1=GUIDE&CFID=22810237&CFTOKEN=34449120, pp. 585-593.

U.S. Appl. No. 09/493,748, filed Jan. 28, 2000 entitled "Adaptive Web Crawling Using a Statistical Model."

U.S. Appl. No. 11/874,579, filed Oct. 18, 2007 entitled "Ranking and Providing Search Results Based in Part on a Number of Click-Through Features."

U.S. Appl. No. 11/874,844, filed Oct. 18, 2007 entitled "Enterprise Relevancy Ranking Using a Neural Network."

U.S. Appl. No. 12/207,910, filed Sep. 10, 2008 entitled "Document Length as a Static Relevance Feature for Ranking Search Results."

Voorhees, E., "Overview of TREC 2002", Gaithersburg, Maryland, Nov. 19-22, 15 pages.

Web Page "Reuters: Renters Corpus", http://about.com/researchandstandards/corpus/, viewed Mar. 18, 2004.

Westerveld, T. et al., "Retrieving Web pages using Content, Links, URLs and Anchors", Proceedings of the Tenth Text Retrieval Conference, NIST Special Publication, 'Online! 2001, pp. 1-10.

Wilkinson, R., "Effective Retrieval of Structured Documents", Annual ACM Conference on Research and Development, 1994, 7 pages.

Xue, et al., "Optimizing Web Search Using Web Click-Through Data," http://people.cs.vt.edu/~xwensi/Publication/p118-xue.pdf, CIKM'04, Nov. 8-13, 2004, 9 pages.

Yi, Jeonghee, et al., "Metadata Based Web Mining for Topic-Specific Information Gathering", IEEE, pp. 359-368, 2000.

Yi, Jeonghee, et al., "Using Metadata to Enhance Web Information Gathering", D.Suciu and G. Vossen (eds.): WebDB 2000, LNCS 1997, pp. 38-57, 2001.

Yuwono, Budi and Lee, Dik L., "Search and Ranking Algorithms for Locating Resources on the World Wide Web", IEEE, 1996, pp. 164-170.

Zamir, O. et al., "Grouper: A Dynamic Clustering Interface to Web Search Results", Computer Networks (Amsterdam, Netherlands: 1999), 31(11-16): pp. 1361-1374, 1999.

Chinese First Official Action in 200510088527.5 mailed Apr. 18, 2008.

Chinese First Official Action in 200510088213.5 mailed May 9, 2008.

Chinese Second Official Action in 200510088213.5 mailed Oct. 10, 2008.

Chinese Decision on Rejection in 200510088213.5 mailed Mar. 6, 2009.

EP Search Report in EP 00309121 mailed Jul. 18, 2002.

EP Exam Report in EP 00309121.2-1522 mailed Jul. 4, 2003.

EP Exam Report in EP 00309121.2-1527 mailed Jun. 16, 2004.

EP Search Report in EP 05105048 mailed Jan. 17, 2006.

EP Search Report in EP 05105110 dated Aug. 11, 2006.

EP Exam Report in EP 00309121.2-1527 mailed Feb. 8, 2007.

EP Exam Report in EP 05105048.2-2201 mailed Apr. 23, 2007.

PCT Search Report in PCT/US2008/011894 mailed Feb. 27, 2009.

U.S. Official Action in U.S. Appl. No. 10/609,315 mailed Dec. 15, 2005.

U.S. Official Action in U.S. Appl. No. 10/609,315 mailed Jun. 1, 2006.

U.S. Official Action in U.S. Appl. No. 10/804,326 mailed Oct. 16, 2006.

U.S. Official Action in U.S. Appl. No. 10/804,326 mailed Dec. 11, 2007.

U.S. Official Action in U.S. Appl. No. 10/804,326 mailed Jun. 7, 2007.

U.S. Official Action in U.S. Appl. No. 10/804,326 mailed Dec. 10, 2008.

U.S. Official Action in U.S. Appl. No. 10/955,462 mailed Nov. 3, 2006.

U.S. Official Action in U.S. Appl. No. 10/955,462 mailed May 11, 2007.

U.S. Official Action in U.S. Appl. No. 10/955,462 mailed Sep. 10, 2007.

U.S. Official Action in U.S. Appl. No. 10/955,983 mailed Mar. 22, 2007.

U.S. Official Action in U.S. Appl. No. 10/955,983 mailed Nov. 13, 2007.

U.S. Official Action in U.S. Appl. No. 10/955,983 mailed Dec. 18, 2008.

U.S. Official Action in U.S. Appl. No. 10/955,983 mailed Jul. 21, 2008.

U.S. Official Action in U.S. Appl. No. 10/981,962 mailed Apr. 5, 2006.

U.S. Official Action in U.S. Appl. No. 10/981,962 mailed Sep. 21, 2006.

U.S. Official Action in U.S. Appl. No. 10/981,962 mailed Apr. 30, 2007.

U.S. Official Action in U.S. Appl. No. 10/981,962 mailed Mar. 17, 2008.

U.S. Official Action in U.S. Appl. No. 11/019,091 mailed Jun. 20, 2007.

U.S. Official Action in U.S. Appl. No. 11/019,091 mailed Apr. 3, 2008.

U.S. Official Action in U.S. Appl. No. 11/019,091 mailed Dec. 11, 2008.

U.S. Official Action in U.S. Appl. No. 11/073,381 mailed Sep. 18, 2007.

U.S. Official Action in U.S. Appl. No. 11/073,381 mailed Jul. 10, 2008.

U.S. Official Action in U.S. Appl. No. 11/238,906 mailed Jan. 8, 2008.

U.S. Official Action in U.S. Appl. No. 11/238,906 mailed Sep. 16, 2008.

U.S. Official Action in U.S. Appl. No. 11/412,723 mailed May 28, 2008.

U.S. Official Action in U.S. Appl. No. 11/412,723 mailed Mar. 6, 2009.

Kleinberg, Jon M., "Authoritative Sources in a Hyperlinked Environment", Proceedings of the aCM-SIAM symposium on Discrete Algorithms, 1998, 34 pages.

Chen, Hsinchun et al., "A Smart Itsy Bitsy Spider for the Web", Journal of the American Society for Information Science, 49(7), pp. 604-618, 1998.

U.S. Official Action in U.S. Appl. No. 10/955,983 mailed Jun. 10, 2009.

U.S. Official Action in U.S. Appl. No. 11/073,381 mailed Apr. 15, 2009.

U.S. Official Action in U.S. Appl. No. 11/238,906 mailed May 19, 2009.

* cited by examiner

RANKING SEARCH RESULTS USING BIASED CLICK DISTANCE

BACKGROUND

Ranking functions that rank documents according to their relevance to a given search query are known. Efforts continue in the art to develop ranking functions that provide better search results for a given search query compared to search results generated by search engines using known ranking functions.

SUMMARY

Described herein are, among other things, various technologies for determining a document relevance score for a given document on a network. The document relevance score is generated via a ranking function that comprises one or more query-independent components, wherein at least one query-independent component includes a biased click distance parameter that takes into account biased click distance values for multiple documents on the network. The ranking functions may be used by a search engine to rank multiple documents in order (typically, in descending order) based on the document relevance scores of the multiple documents.

This Summary is provided to generally introduce the reader to one or more select concepts describe below in the "Detailed Description" section in a simplified form. This Summary is not intended to identify key and/or required features of the claimed subject matter.

DETAILED DESCRIPTION

To promote an understanding of the principles of the methods and processes disclosed herein, descriptions of specific embodiments follow and specific language is used to describe the specific embodiments. It will nevertheless be understood that no limitation of the scope of the disclosed methods and processes is intended by the use of specific language. Alterations, further modifications, and such further applications of the principles of the disclosed methods and processes discussed are contemplated as would normally occur to one ordinarily skilled in the art to which the disclosed methods and processes pertains.

Methods of determining a document relevance score for documents on a network are disclosed. Each document relevance score is calculated using a ranking function that contains one or more query-dependent components (e.g., a function component that depends on the specifics of a given search query or search query term), as well as one or more query-independent components (e.g., a function component that that does not depend on a given search query or search query term). The document relevance scores determined by the ranking function may be used to rank documents within a network space (e.g., a corporate intranet space) according to each document relevance score. An exemplary search process in which the disclosed methods may be used is shown as exemplary process 10 in FIG. 1.

Figure 1:
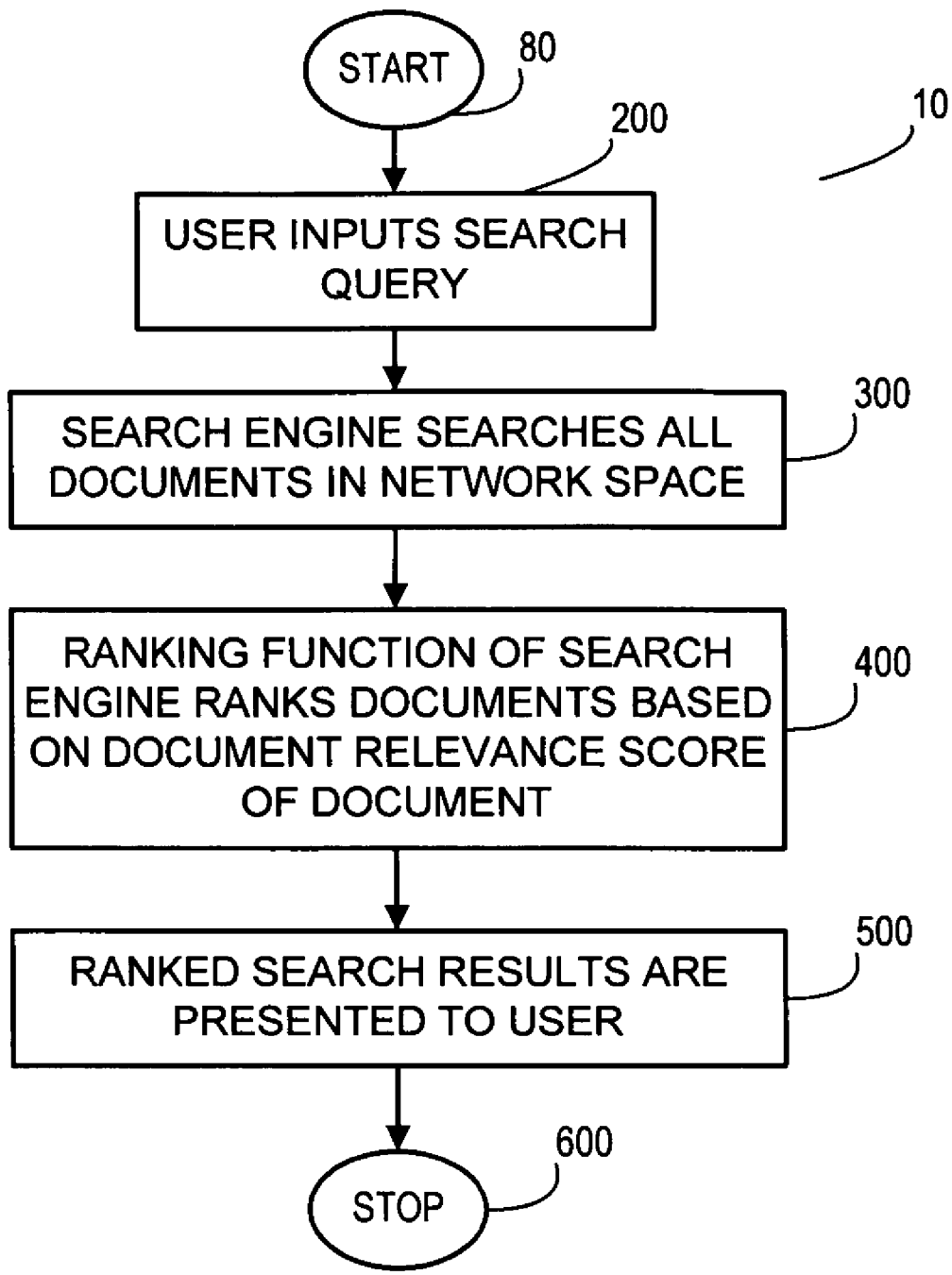
FIG. 1 represents an exemplary logic flow diagram showing exemplary steps in a method of producing ranked search results in response to a search query inputted by a user.

FIG. 1 depicts exemplary search process 10, which starts with process step 80, wherein a user inputs a search query. From step 80, exemplary search process 10 proceeds to step 200, wherein a search engine searches all documents within a network space for one or more terms of the search query. From step 200, exemplary search process 10 proceeds to step 300, wherein a ranking function of the search engine sorts the documents within the network space based on the relevance score of each document, the document relevance score being based on one or more query-dependent components and one or more query-independent components. From step 300, exemplary search process 10 proceeds to step 400, wherein sorted search results are presented to the user, typically in decreasing order of relevance, identifying documents within the network space that are most relevant to the search query.

As discussed in more detail below, in some exemplary methods of determining a document relevance score, at least one query-independent component of a ranking function used to determine a document relevance score takes in to account a "biased click distance" of each document within a network space. The biased click distance for certain documents, referred to herein as "authoritative documents" within a network or "authoritative nodes" on a web graph, may be assigned an initial click distance value, in order to identify these documents as having different degrees of importance relative to each other, and possibly a higher degree of importance relative to the rest of the documents on the network. The remaining documents, referred to herein as "non-authoritative documents" within a network or "non-authoritative nodes" on a web graph, have a biased click distance value that is calculated based on their location to the closest authoritative document within a network space (or closest authoritative node on a web graph) resulting in click distance values biased towards the authoritative nodes.

In one exemplary embodiment, a biased click distance value may be assigned to m authoritative documents on a network comprising N total documents, wherein m is greater than or equal to 2 and less than N. In this exemplary embodiment, a system administrator manually selects or application code within a search system automatically identifies m authoritative documents within a given network space that have some degree of importance within the network space. For example, one of the m authoritative documents may be a homepage of a website or another page linked directly to the homepage of a website.

In another exemplary embodiment, at least two of the biased click distance values assigned to the m authoritative documents differ from one another. In this embodiment, different numerical values may be assigned to two or more m authoritative documents in order to further quantify the importance of one authoritative document to another authoritative document. For example, the importance of a given authoritative document may be indicated by a low biased click distance value. In this example, authoritative documents having a biased click distance value equal to 0 will be considered more important than authoritative documents having a biased click distance value greater than 0.

The disclosed methods of determining a document relevance score may further utilize a ranking function that comprises at least one query-independent component that includes an edge value parameter that takes into account edge values assigned to each edge on the network, wherein each edge connects one document to another document within the hyperlinked structure of the network (or one node to another node on a web graph). Assigning edge values to one or more edges connecting documents to one another on a network provides a further method of affecting the document relevance score of documents on the network. For example, in the example described above wherein a lower biased click distance value indicates the importance of a given document, increasing an edge value between two documents, such as a first document and a second document linked to the first document, further reduces the importance of the second document (i.e., the linked document) relative to the first document. Conversely, by assigning a lower edge value to the edge between the first document and second document, the importance of the second document becomes greater relative to the first document.

In an exemplary embodiment, two or more edges linking documents within a network space may be assigned edge values that differ from one another. In this exemplary embodiment, different numerical values may be assigned to two or more edges in order to further quantify the importance of one document to another within a network space. In other exemplary embodiments, all of the edges linking documents within a network space are assigned the same edge value, wherein the assigned edge value is 1 or some other positive number. In yet another embodiment, the edge values are equal to one another and are equal to or greater than the highest biased click distance value initially assigned to one or more authoritative documents.

In yet a further exemplary embodiment, the disclosed methods of determining a document relevance score utilizes a ranking function that comprises at least one query-independent component, which includes both the above-described biased click distance parameter and the above-described edge value parameter.

The document relevance score may be used to rank documents within a network space. For example, a method of ranking documents on a network may comprise the steps of determining a document relevance score for each document on the network using the above-described method; and ranking the documents in a desired order (typically, in descending order) based on the document relevance scores of each document.

The document relevance score may also be used to rank search results of a search query. For example, a method of ranking search results of a search query may comprise the steps of determining a document relevance score for each document in the search results of a search query using the above-described method; and ranking the documents in a desired order (typically, in descending order) based on the document relevance scores of each document.

Application programs using the methods disclosed herein may be loaded and executed on a variety of computer systems comprising a variety of hardware components. An exemplary computer system and exemplary operating environment for practicing the methods disclosed herein is described below.

Exemplary Operating Environment

Figure 2:
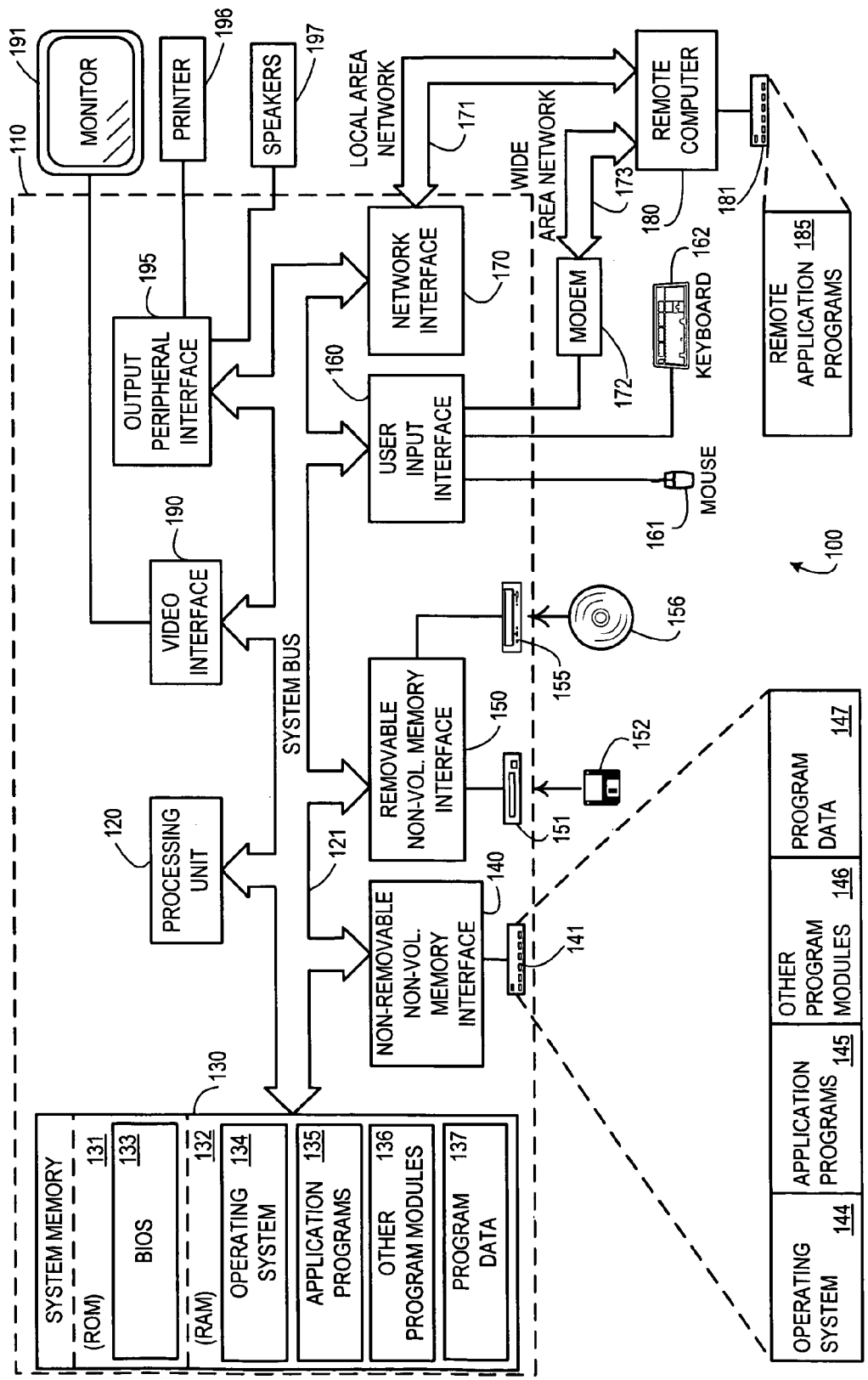
FIG. 2 is a block diagram of some of the primary components of an exemplary operating environment for implementation of the methods and processes disclosed herein.

FIG. 2 illustrates an example of a suitable computing system environment 100 on which the methods disclosed herein may be implemented. The computing system environment 100 is only one example of a suitable computing environment and is not intended to suggest any limitation as to the scope of use or functionality of the methods disclosed herein. Neither should the computing environment 100 be interpreted as having any dependency or requirement relating to any one or combination of components illustrated in the exemplary operating environment 100.

The methods disclosed herein are operational with numerous other general purpose or special purpose computing system environments or configurations. Examples of well-known computing systems, environments, and/or configurations that may be suitable for use with the methods disclosed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The methods and processes disclosed herein may be described in the general context of computer-executable instructions, such as program modules, being executed by a computer. Generally, program modules include routines, programs, objects, components, data structures, etc. that perform particular tasks or implement particular abstract data types. The methods and processes disclosed herein may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the methods and processes disclosed herein includes a general purpose computing device in the form of a computer 110. Components of computer 110 may include, but are not limited to, a processing unit 120, a system memory 130, and a system bus 121 that couples various system components including, but not limited to, system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media as used herein.

System memory 130 includes computer storage media in the form of volatile and/or nonvolatile memory such as read only memory (ROM) 131 and random access memory (RAM) 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

Computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 141 is typically connected to system bus 121 through a non-removable memory interface such as interface 140, and magnetic disk drive 151 and optical disk drive 155 are typically connected to system bus 121 by a removable memory interface, such as interface 150.

The drives and their associated computer storage media discussed above and illustrated in FIG. 2 provide storage of computer readable instructions, data structures, program modules and other data for computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to processing unit 120 through a user input interface 160 that is coupled to system bus 121, but may be connected by other interface and bus structures, such as a parallel port, game port or a universal serial bus (USB). A monitor 191 or other type of display device is also connected to system bus 121 via an interface, such as a video interface 190. In addition to monitor 191, computer 110 may also include other peripheral output devices such as speakers 197 and printer 196, which may be connected through an output peripheral interface 195.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172 or other means for establishing communications over WAN 173, such as the Internet. Modem 172, which may be internal or external, may be connected to system bus 121 via user input interface 160, or other appropriate mechanism. In a networked environment, program modules depicted relative to computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Methods and processes disclosed herein may be implemented using one or more application programs including, but not limited to, a search ranking application, which could be one of numerous application programs designated as application programs 135, application programs 145 and remote application programs 185 in exemplary system 100.

As mentioned above, those skilled in the art will appreciate that the disclosed methods of generating a document relevance score for a given document may be implemented in other computer system configurations, including hand-held devices, multiprocessor systems, microprocessor-based or programmable consumer electronics, networked personal computers, minicomputers, mainframe computers, and the like. The disclosed methods of generating a document relevance score for a given document may also be practiced in distributed computing environments, where tasks are performed by remote processing devices that are linked through a communications network. In a distributed computing environment, program modules may be located in both local and remote memory storage devices.

Implementation of Exemplary Embodiments

As discussed above, methods of determining a document relevance score for a document on a network are provided. The disclosed methods may rank a document on a network utilizing (i) a ranking function that takes into account a biased click distance value of each document on the network, (ii) a ranking function that takes into account one or more edge values assigned to edges (or links) between documents on the network, or (iii) both (i) and (ii).

The disclosed methods of determining a document relevance score for a document on a network may comprise a number of steps. In one exemplary embodiment, the method of determining a document relevance score for a document on a network comprises the steps of storing document and link information for documents on a network; generating a representation of the network from the document and link information, wherein the representation of the network includes nodes that represent the documents and edges that represent the links; assigning a biased click distance value ($CD_A$) to at least two nodes on the network, wherein the nodes that are assigned a biased click distance value are authoritative nodes; computing a biased click distance for each of the non-authoritative nodes in the representation of the network, wherein a biased click distance for a given non-authoritative node is measured from the given non-authoritative node to an authoritative node closest to the given non-authoritative node, wherein the computing step results in a computed biased click distance value ($CD_C$) for each non-authoritative document; and using the biased click distance value (i.e., ($CD_A$ or $CD_C$) for each document to determine the document relevance score of a given document on the network.

The step of storing document and link information for documents on a network may be performed by indexing application code commonly found on computing systems. The indexing application code generates a representation of the network from the document and link information, wherein the representation of the network includes nodes that represent the documents and edges that represent the links. Such a representation of the network is commonly referred to as a "web graph." One exemplary method of generating a web graph comprises using data gathered by a process where link and anchor text information is gathered and attributed to specific target documents of the anchor. This process and the concept of anchor text is described more fully in U.S. patent application Ser. No. 10/955,462 entitled "SYSTEM AND METHOD FOR INCORPORATING ANCHOR TEXT INTO RANKING SEARCH RESULTS" filed on Aug. 30, 2004, the subject matter of which is hereby incorporated by reference in its entirety.

Figure 3:
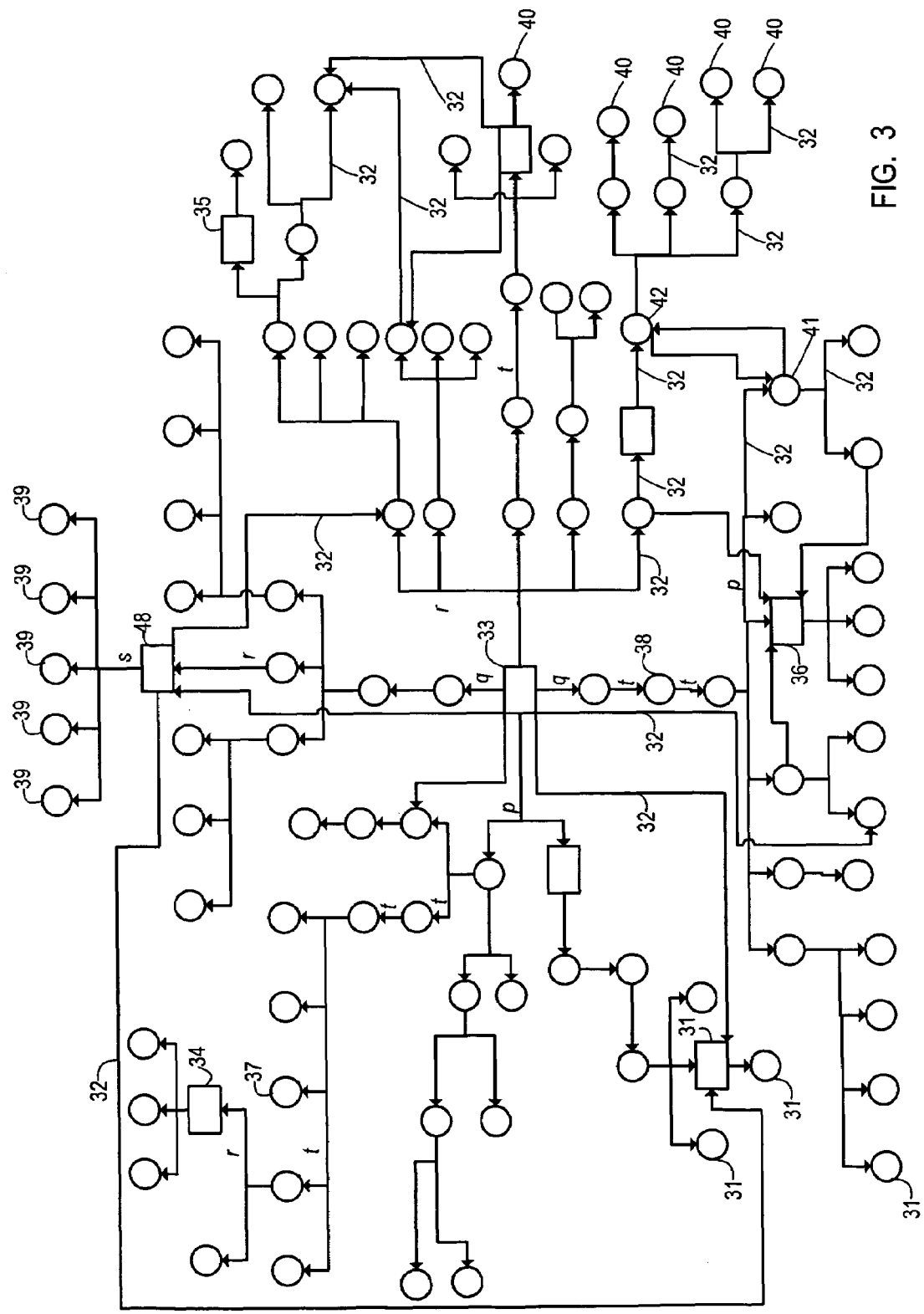
FIG. 3 depicts an exemplary web graph identifying documents in a network space, links between the documents, authoritative nodes having an assigned biased click distance value, and non-authoritative nodes having a calculated biased click distance value.

FIG. 3 depicts an exemplary web graph identifying documents in a network space and links between the documents. As shown in FIG. 3, exemplary web graph 30 comprises nodes 31, which represent each document within a given network space (e.g., a corporate intranet), and edges 32, which represent links between documents within a given network space. It should be understood that exemplary web graph 30 is an overly simplified representation of a given network space. Typically, a given network space may comprise hundreds, thousands or millions of documents and hundreds, thousands or millions of links connecting documents to one another. Further, although exemplary web graph 30 depicts up to eight links connected to a given node (e.g., central node 33), it should be understood that in an actual network setting, a given node may have hundreds of links connecting the node (e.g., document) to hundreds of other documents within the network (e.g., the home page of a network may be linked to every page within the network).

In addition, exemplary web graph 30 shows very few cycles (e.g., a first node linking to a second node, which may link to additional nodes, wherein the second node or one of the additional nodes links back to the first node). One such cycle is represented by nodes 41 and 42 in FIG. 3. Other cycles could be represented if any of end nodes 40 linked back to any other node shown in FIG. 3, such as central node 33. Regardless of the simplicity or complexity of a given web graph, the disclosed methods of generating a document relevance score for a given document may be used on any web graph, including those containing cycles.

Once a web graph has been generated, one or more techniques may be used to affect the relative importance of one or more documents within the network space, represented by the nodes of the web graph. As discussed above and below, these techniques include, but are not limited to, (i) designating two or more nodes as authoritative nodes; (ii) assigning each of the authoritative nodes a biased click distance value ($CD_A$), (iii) optionally, assigning two or more biased click distance values ($CD_A$) that differ from one another; (iv) assigning edge value to each edge of the web graph; (v) optionally, assigning a minimum edge value to each edge of the web graph, wherein the minimum edge value is greater than a maximum or highest assigned biased click distance values ($CD_{Amax}$); (vi) optionally, assigning two or more edge values that differ from one another; (vii) calculating a biased click distance value ($CD_C$) for each non-authoritative node; and (viii) optionally, downgrading any of the biased click distance values ($CD_A$ or $CD_C$), when necessary, if test queries using the biased click distance values generate irrelevant search results. Some of the above-described exemplary techniques for affecting the biased click distance value of one or more documents within the network represented by exemplary web graph 30 are shown in FIG. 3.

In exemplary web graph 30, nodes 31 having a square shape are used to identify authoritative nodes within the network, while nodes 31 having a circular shape are used to identify non-authoritative nodes. It should be understood that any number of nodes within a given web graph may be designated as authoritative nodes depending on a number of factors including, but not limited to, the total number of documents within the network space, and the number of "important" documents that are within the network space. In exemplary web graph 30, 9 of the 104 nodes are designated as authoritative nodes (i.e., represent 9 out of 104 documents as being as particular importance).

Further, although not shown on exemplary web graph 30, each edge 32 between each pair of nodes 31 has an edge weight associated therewith. Typically, each edge 32 has a default edge weight of 1; however, as discussed above, an edge weight other than 1 can be assigned to each edge 32. Further, in some embodiments, two or more different edge weights may be assigned to edges within the same web graph. In FIG. 3, letters p, q, r, s and t shown on exemplary web graph 30 are used to indicate edge values of some of edges 32. As discussed above, edge values p, q, r, s and t may have a value of 1, a value other than 1, and/or values that differ from one another in order to further affect biased click distance values of nodes 31 within exemplary web graph 30. Typically, edge values for p, q, r, s and t, as well as the other edges in exemplary web graph 30, are the same number, and are typically equal to or greater than 1. In some embodiments, edge values for p, q, r, s and t, as well as the other edges in exemplary web graph 30, are the same number, and are equal to or greater than the highest biased click distance value assigned to an authoritative node.

The one or more techniques used to modify a web graph in order to affect biased click distance values of documents on a network may be manually initiated and performed by a system administrator. The system administrator can view a given web graph, and edit the web graph as desired to increase and/or decrease the relative importance of one or more documents within a network space as described above. Application code, such as application code in a computing system capable of conducting a search query, may automatically produce a bias in a web graph using one or more of the above-described techniques (e.g., calculating a biased click distance value ($CD_C$) for each non-authoritative node).

Figure 4A:
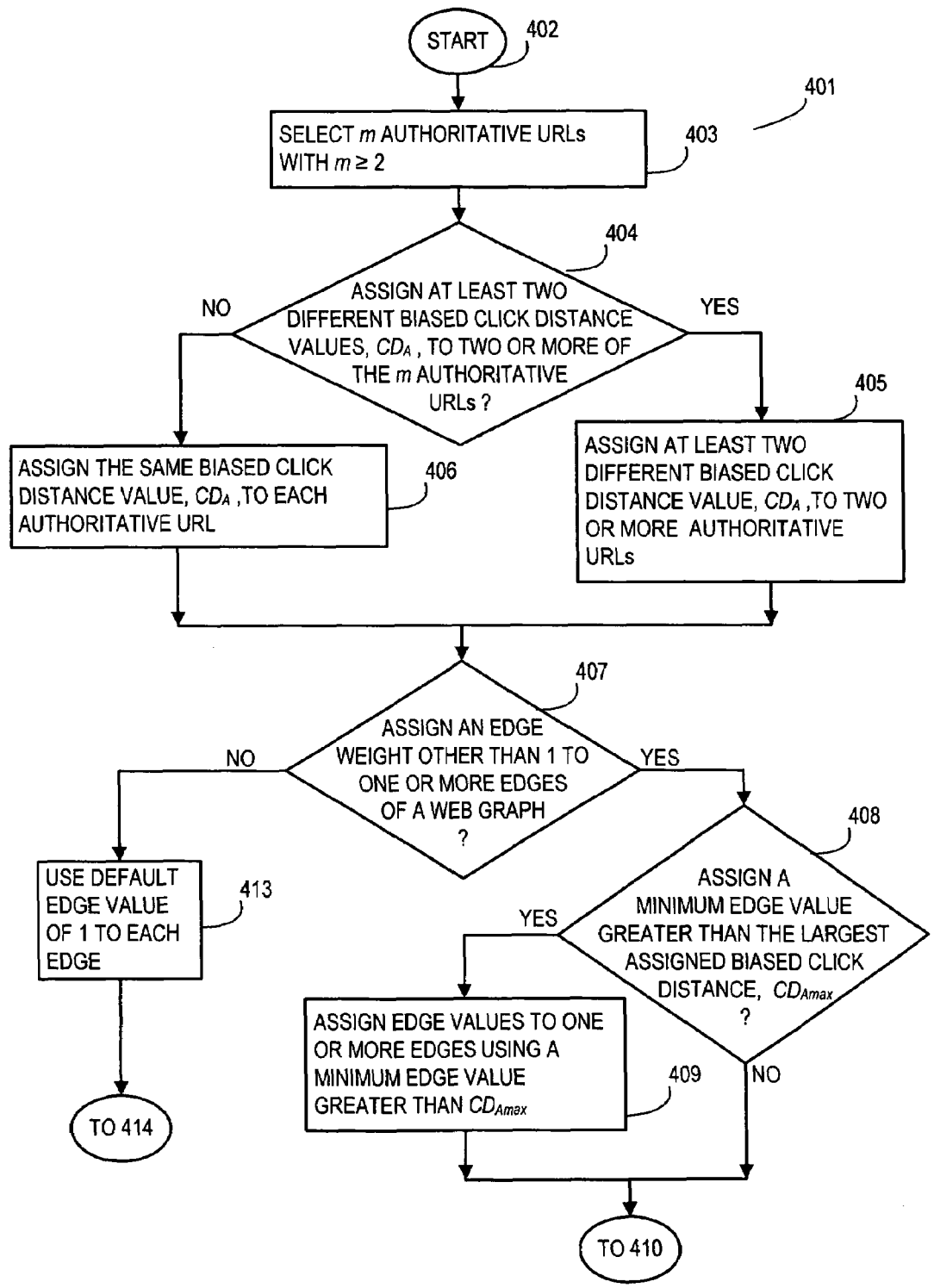
FIGS. 4A-4B represent a logic flow diagram showing exemplary steps in a method of assigning and generating biased click distance values for nodes on a web graph.
Figure 4B:
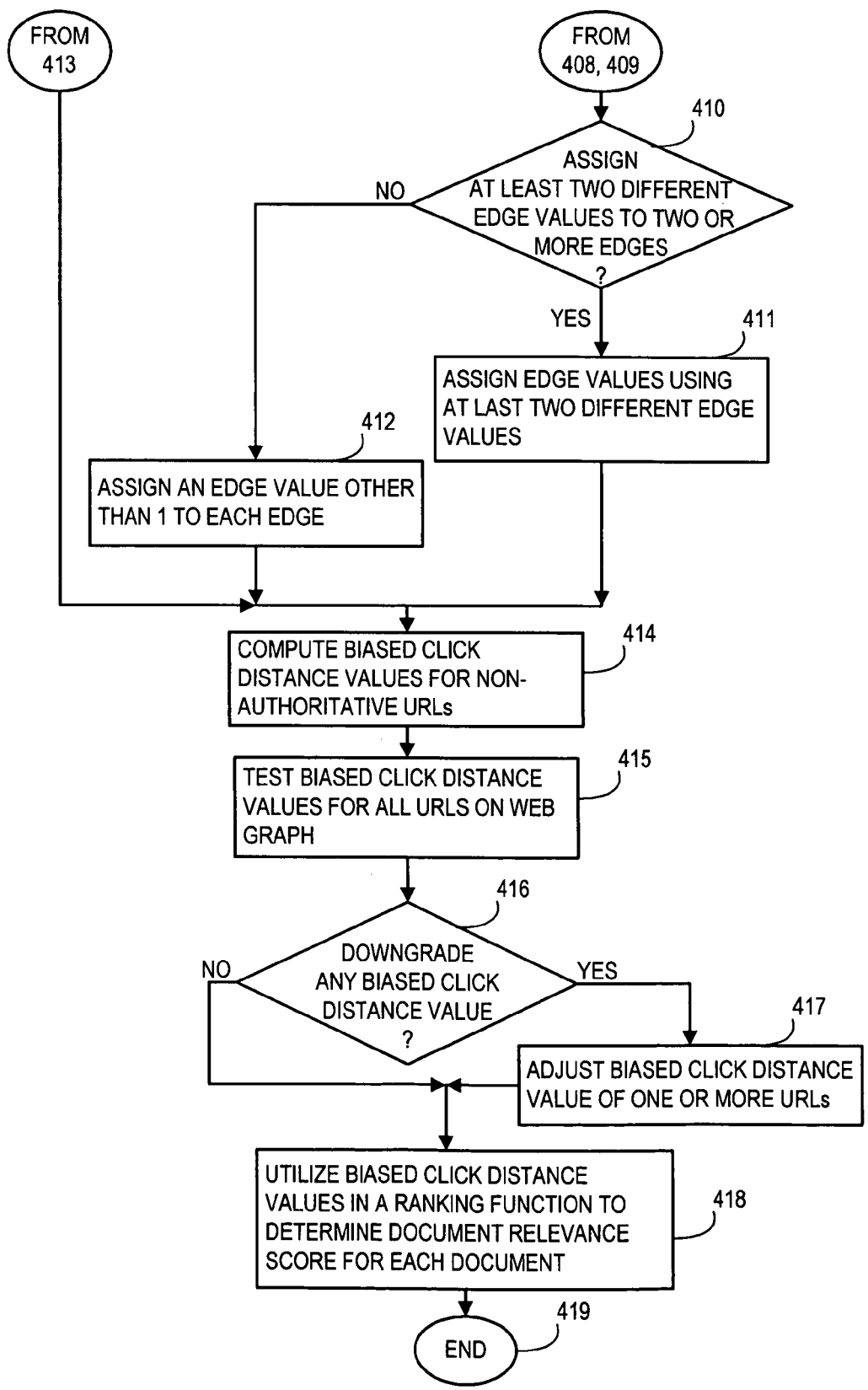

FIGS. 4A-4B represent a logic flow diagram showing exemplary steps in an exemplary method of assigning and generating biased click distance values for nodes on a web graph followed by an optional downgrading procedure by a system administrator. As shown in FIG. 4A, exemplary method 401 starts at block 402 and proceeds to step 403. In step 403, a number of authoritative nodes (or URLs) are selected out of N total nodes (or URLs) within a network space. In exemplary method 401, m authoritative nodes (or URLs) are selected, wherein m is greater than or equal to 2. Once the authoritative nodes (or URLs) are selected, exemplary method 401 proceeds to decision block 404.

At decision block 404, a determination is made by a system administrator whether to assign at least two different biased click distance values ($CD_A$) to two or more of the m authoritative nodes (or URLs). If a decision is made to assign at least two different biased click distance values ($CD_A$) to two or more of the m authoritative nodes (or URLs), exemplary method 401 proceeds to step 405, wherein at least two different biased click distance values ($CD_A$) are assigned to two or more of the m authoritative nodes (or URLs). For example, referring to exemplary web graph 30 shown in FIG. 3, authoritative nodes 33 and 34 may be assigned a biased click distance value of 0, authoritative nodes 35 and 36 may be assigned a biased click distance value of +3, and authoritative node 48 may be assigned a biased click distance value of +2. From step 405, exemplary method 401 proceeds to decision block 407.

Returning to decision block 404, if a decision is made not to assign at least two different biased click distance values ($CD_A$) to two or more of the m authoritative nodes (or URLs), exemplary method 401 proceeds to step 406, wherein the same biased click distance value ($CD_A$) is assigned to each of the m authoritative nodes (or URLs). For example, referring to exemplary web graph 30 of FIG. 3 again, each of the authoritative nodes may be assigned a biased click distance value, such as 0, +2, or +5. From step 406, exemplary method 401 proceeds to decision block 407.

At decision block 407, a determination is made by a system administrator or application code whether to assign an edge weight other than 1 to one or more edges of a web graph. If a decision is made to assign an edge weight other than 1 to one or more edges of a web graph, exemplary method 401 proceeds to decision block 408. At decision block 408, a determination is made by a system administrator whether to assign a minimum edge value to the edges of a web graph, wherein the minimum edge value is greater than the largest assigned biased click distance value ($CD_{Amax}$). If a decision is made to assign a minimum edge value to the edges of a web graph, wherein the minimum edge value is greater than the largest assigned biased click distance value ($CD_{Amax}$), exemplary method 401 proceeds to step 409, wherein a minimum edge value greater than the largest assigned biased click distance value ($CD_{Amax}$) is assigned to each edge of a web graph. For example, referring to exemplary web graph 30 shown in FIG. 3, if authoritative node 33 is assigned the largest biased click distance value ($CD_{Amax}$) and $CD_{Amax}$ equals +3, a minimum edge value of greater than +3 is assigned to each edge 32 shown in FIG. 3.

In some embodiments, applying a minimum edge value that is greater than the largest assigned biased click distance value ($CD_{Amax}$) to each edge of a web graph may have some advantages. In this embodiment, such a technique guarantees that the assigned biased click distance value ($CD_A$) of each authoritative node (or document or URL) is less than the calculated biased click distance value ($CD_C$) of every non-authoritative node (or document or URL) in a web graph. When importance of a document is based on a lower biased click distance value, such a technique enables all of the authoritative nodes (or documents or URLs) to be considered more important than the non-authoritative nodes (or documents or URLs) within a web graph.

From step 409, exemplary method 401 proceeds to decision block 410 shown in FIG. 4B and described below. Returning to decision block 408, if a decision is made not to assign a minimum edge value to each edge, wherein the minimum edge value is greater than the largest assigned biased click distance value ($CD_{Amax}$), exemplary method 401 proceeds directly to decision block 410 shown in FIG. 4B and described below. In this embodiment, it is possible for a non-authoritative node to have a biased click distance value less than an authoritative node (i.e., be considered more important than the authoritative node wherein importance of a document is based on a lower biased click distance value). For example, referring to exemplary web graph 30 of FIG. 3, if authoritative node 34 is assigned a biased click distance value of +3, authoritative node 48 is assigned a biased click distance value of 0, and edge value s is +1, non-authoritative nodes 39 have a calculated biased click distance value of +1 (i.e., the sum of the assigned biased click distance value of the closest authoritative node 48, 0, and edge value s, +1.

At decision block 410 shown in FIG. 4B, a determination is made by a system administrator whether to assign at least two different edge values to two or more edges of a web graph. If a decision is made to assign at least two different edge values to two or more edges of a web graph, exemplary method 401 proceeds to step 411, wherein at least two different edge values are assigned to two or more edges of a web graph. For example, referring to exemplary web graph 30 shown in FIG. 3, any two of edge values p, q, r, s and t may be assigned at least two different numbers. From step 411, exemplary method 401 proceeds to step 414 described below.

Returning to decision block 410, if a decision is made not to assign at least two different edge values to two or more edges of a web graph, exemplary method 401 proceeds to step 412, wherein the same edge value is assigned to each edge of a web graph, and the edge value is a value other than 1. For example, referring to exemplary web graph 30 shown in FIG. 3, each of edge values p, q, r, s and t are assigned the same number and a number other than 1. From step 412, exemplary method 401 proceeds to step 414 described below.

Returning to decision block 407 shown in FIG. 4A, if a decision is made not to assign an edge weight to one or more edges of a web graph, exemplary method 401 proceeds to step 413, wherein a default edge value (e.g., +1) is used for each edge of a web graph so that the edges of the web graph have a minimal effect on calculated biased click distance values. In this embodiment, factors such as the number and location of authoritative nodes have a greater effect on calculated biased click distance values than the default edge values. From step 413, exemplary method 401 proceeds to step 414 shown in FIG. 4B.

In step 414, biased click distance values ($CD_C$) for non-authoritative nodes (or documents or URLs) are calculated. As described in more detail below, the biased click distance value for a given target node (i.e., non-authoritative node) ($CD_{Ctarget}$) linked directly to an authoritative node may be calculated using the formula:

$$CD_{Ctarget} = \min(CD_{Aclosest} + \text{EdgeWeight}),$$

wherein $CD_{Aclosest}$ represents the assigned biased click distance value for the authoritative node closest to the target node; and EdgeWeight (also referred to herein as EdgeValue) represents the edge value or edge weight assigned to the edge linking the closest authoritative node to the target node. The min(x) function is used to indicate that a minimal calculated biased click distance value is used for a given node, for example, if the node is linked directly to two authoritative nodes. The biased click distance value for a given target node (i.e., non-authoritative node) ($CD_{Ctarget}$) other than those linked directly to an authoritative node may be calculated using the formula:

$$CD_{Ctarget} = \min(CD_{Cmin} + \text{EdgeWeight}),$$

wherein $CD_{Cmin}$ represents the calculated biased click distance value of an adjacent node having the lowest calculated biased click distance value; and EdgeWeight represents the edge value or edge weight assigned to the edge linking the adjacent node having the lowest calculated biased click distance value and the target node. From step 414, exemplary method 401 proceeds to step 415.

In step 415, the resulting biased click distance values, assigned ($CD_A$) and calculated ($CD_C$), are tested by a system administrator. Typically, the system administrator tests the system by executing one or more search queries using the resulting biased click distance values (assigned ($CD_A$) and calculated ($CD_C$)). If the system administrator notices obviously irrelevant content coming back, the system administrator can use the above-described biasing tools/techniques to downgrade one or more sites, for example, archive folders or web sites, generating the irrelevant content. The above-described test enables a system administrator to evaluate the biased click distance values for possible inconsistencies between (i) the actual importance of a given document within a network space and (ii) the importance of the document as indicated by its biased click distance value. From step 415, exemplary method 401 proceeds to decision block 416.

At decision block 416, a determination is made by a system administrator whether to downgrade any biased click distance values in order to more closely represent the importance of a given document within a network space. If a decision is made to downgrade one or more biased click distance values in order to more closely represent the importance of one or more documents within a network space, exemplary method 401 proceeds to step 417, wherein the biased click distance values of one or more documents (or URLs) are adjusted either negatively or positively. From step 417, exemplary method 401 proceeds to step 418.

Returning to decision block 416, if a decision is made not to downgrade one or more biased click distance values in order to more closely represent the importance of one or more documents within a network space, exemplary method 401 proceeds directly to step 418. In step 418, the biased click distance values assigned to authoritative nodes and calculated for non-authoritative nodes are utilized in a ranking function to determine an overall document relevance score for each document within a network space. From step 418, exemplary method 401 proceeds to end block 419.

As discussed above, biased click distance values ($CD_C$) for non-authoritative nodes (or URLs) on a web graph are calculated based on the shortest distance between a given non-authoritative node (or URLs), also referred to as a "target node," and the closest authoritative node (or URL). One exemplary process for calculating the biased click distance values ($CD_C$) for non-authoritative URLs within a network space is depicted in FIGS. 5A-5B.

Figure 5A:
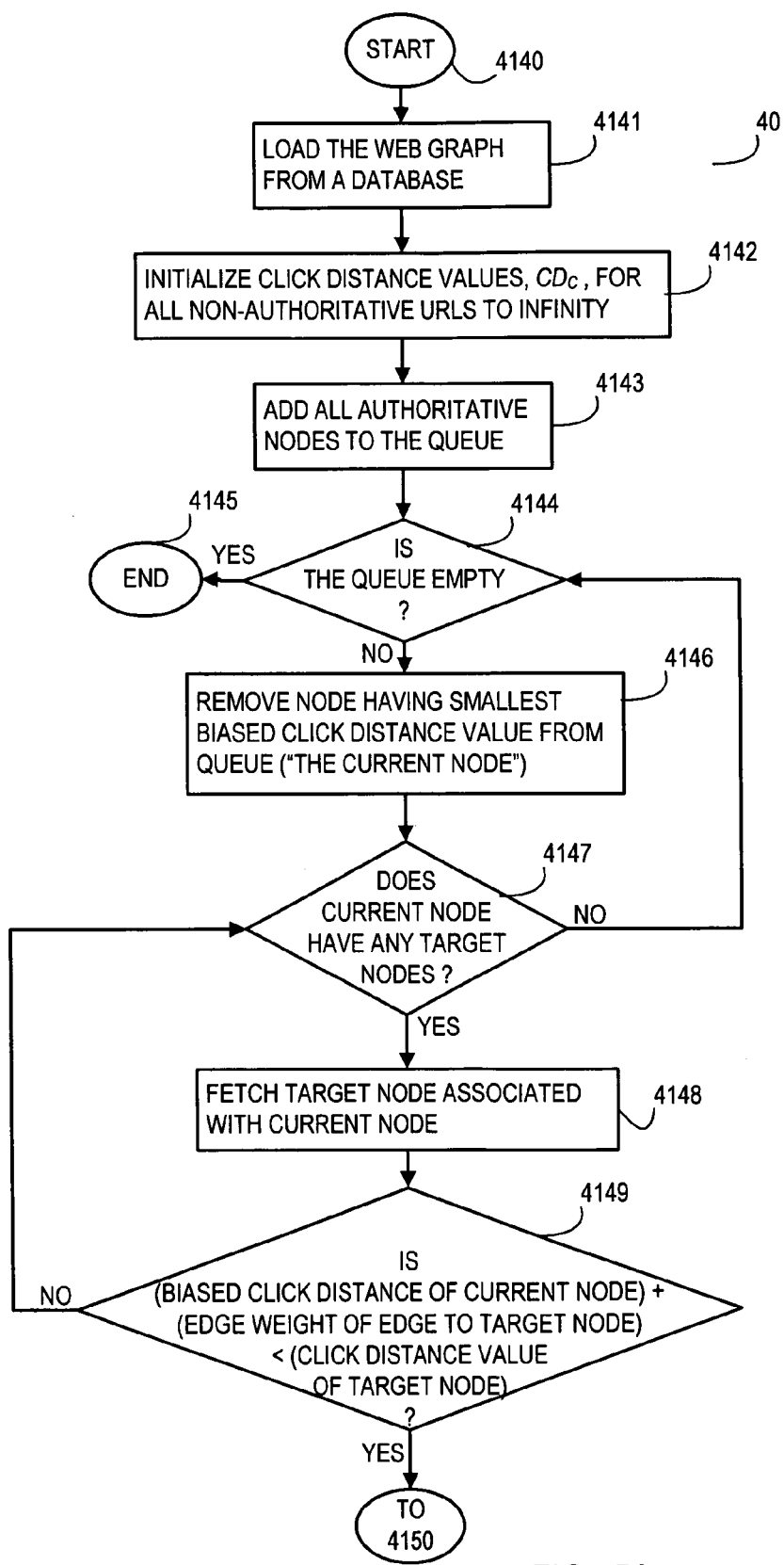
FIGS. 5A-5B represent a logic flow diagram showing exemplary steps in a method of generating biased click distance values for non-authoritative nodes on a web graph.
Figure 5B:
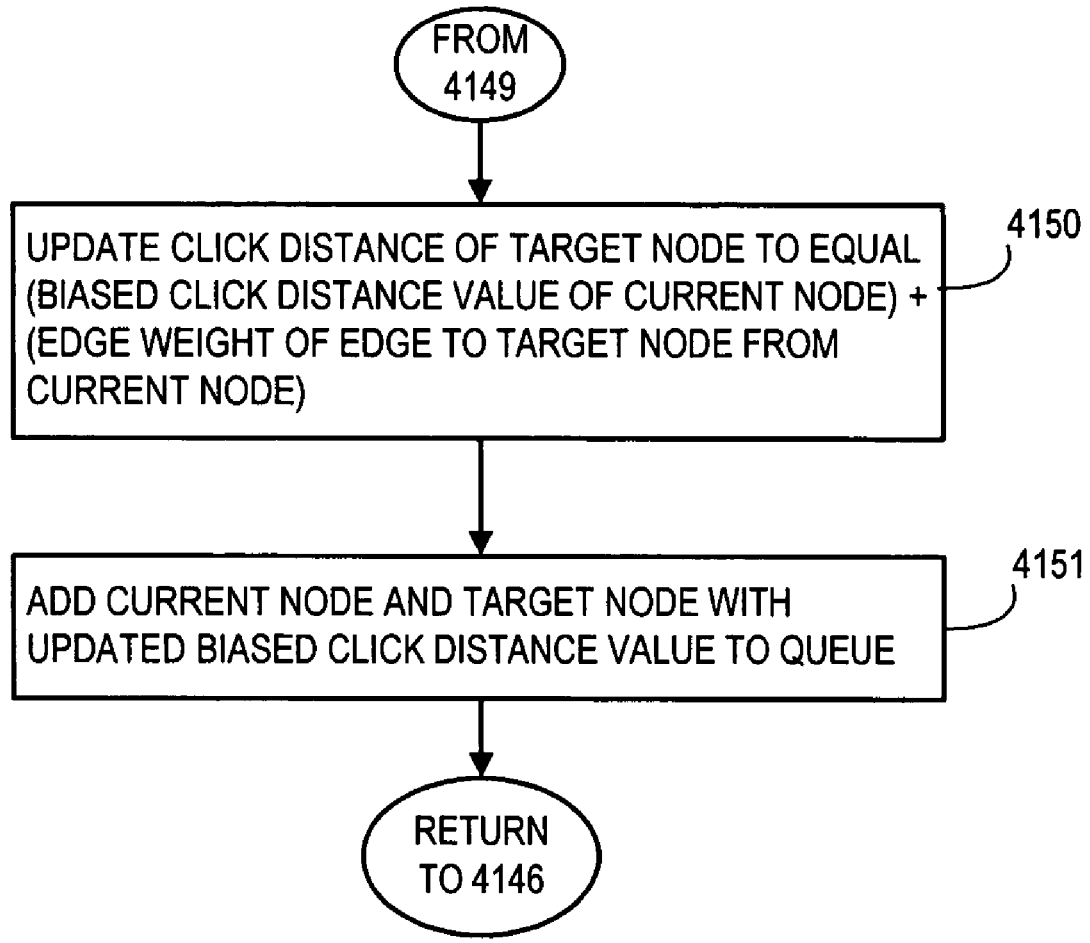

FIGS. 5A-5B illustrate a logical flow diagram of an exemplary process 40 for calculating the biased click distance ($CD_C$) for non-authoritative nodes (or URLs) within a network space. Exemplary process 40 starts at block 4140 and proceeds to step 4141, where a web graph comprising (i) authoritative nodes with their assigned biased click distance values ($CD_A$), (ii) non-authoritative nodes, (iii) links between nodes, and (iv) edge values for each link is loaded from a database into memory. (See, for example, exemplary web graph 30 in FIG. 3). The web graph may have been previously generated using an indexing procedure as described above. From step 4141, exemplary process 40 proceeds to step 4142.

In step 4142, biased click distance values ($CD_C$) for non-authoritative nodes are initialized to a maximum biased click distance value, such as infinity. Assigning a maximum biased click distance value, such as infinity, to the non-authoritative nodes identifies nodes for which a biased click distance value ($CD_C$) needs to be calculated. Once initialization of maximum biased click distance values is complete, exemplary process 40 proceeds to step 4143.

In step 4143, the m authoritative nodes are inserted into a queue. The m authoritative nodes inserted into the queue correspond to the m most authoritative nodes of the network space as pre-determined by a system administrator or some other system determinator. Once the m authoritative nodes are added to the queue, exemplary process 40 proceeds to decision block 4144.

At decision block 4144, a determination is made by the application code as to whether the queue is empty. An empty queue signifies that all nodes of the web graph have either (i) obtained an assigned biased click distance value ($CD_A$) or (ii) had their biased click distance value calculated ($CD_C$). If the queue is empty, exemplary process 40 proceeds to end block 4145 where exemplary process 40 ends. However, if the queue is not empty, exemplary process 40 continues to step 4146.

In step 4146, the node having the smallest biased click distance value (i.e., $CD_A$ or $CD_C$) is removed from the queue. This node is referred to herein as "the current node." During the first iteration through exemplary process 40, the authoritative node having the smallest assigned biased click distance value (i.e., $CD_{Amin}$) is the current node. During subsequent iterations through exemplary process 40, the node having the smallest biased click distance value may be an authoritative node or a non-authoritative node. During the last iteration through exemplary process 40, the node having the smallest assigned biased click distance value will typically be a non-authoritative node. Once the node having the smallest biased click distance value (i.e., $CD_A$ or $CD_C$) is removed from the queue, exemplary process 40 proceeds to decision block 4147.

At decision block 4147, a determination is made by the application code as to whether the current node has any target nodes. As used herein, the term "target node" or "target nodes" refers to one or more nodes linked to the current node. If the current node does not have any target nodes, exemplary process 40 returns to decision block 4144 to again determine whether the queue is empty, and then proceeds as discussed above. However, if the current node has one or more target nodes, exemplary process 40 proceeds to step 4148.

In step 4148, a target node associated with the current node is retrieved from the web graph and evaluated. For example, referring to exemplary web graph 30 of FIG. 3, if authoritative node 48 is the current node (i.e., the node having the smallest biased click distance value), any one of non-authoritative nodes 39 could be the target node (i.e., a node linked to authoritative node 48 and having an initial biased click distance value set to infinity). Once a current node and a target node are selected, exemplary process 40 proceeds to decision block 4149.

At decision block 4149, a determination is made by the application code whether the click distance associated with the target node biased click distance value is greater than the biased click distance value of the current node plus an edge weight value for the edge connecting the current node to the target node. If a determination is made that the target node biased click distance value is greater than the biased click distance value of the current node plus an edge weight value for the edge connecting the current node to the target node, exemplary process 40 proceeds to step 4150 (shown in FIG. 5B), wherein the target node biased click distance value is updated to equal the biased click distance value of the current node plus the edge weight value of the edge connecting the current node to the target node.

During the first iteration through exemplary process 40, all target nodes will have an initial target node biased click distance value set to infinity. Consequently, exemplary process 40 will proceed to step 4150, wherein the biased click distance value of the target node is updated as described above. However, in subsequent iterations through exemplary process 40, the selected target node may, for example, have an initial target node biased click distance value set to infinity (exemplary process 40 will proceed to step 4150) or may have a biased click distance value previously configured by the system administrator (e.g., the target node is an authoritative node). From step 4150, exemplary process 40 proceeds to step 4151.

In step 4151, the current node and the target node with an updated target node biased click distance value are both added to the queue. From step 4150, exemplary process 40 returns to decision block 4146 (shown in FIG. 5A) and continues as described above.

Returning to decision block 4149 (shown in FIG. 5A), if a determination is made that the target node biased click distance value is not greater than the biased click distance value of the current node plus an edge weight value for the edge connecting the current node to the target node, (i) the target node keeps its calculated target node biased click distance value, (ii) the target node remains out of the queue, and (iii) exemplary process 40 returns to decision block 4147 (shown in FIG. 5A), where a determination is made whether the current node has any other target nodes. If a determination is made that the current node does not have another target node, exemplary process 40 returns to decision block 4144 and continues as described above. If a determination is made that the current node has another target node, exemplary process 40 proceeds to step 4148 and continues as described above.

When exemplary process 40 returns to step 4148, another target node associated with the current node is selected and evaluated as described above. If the selected target node has not been selected before, the target node will have an initial biased click distance value set to infinity, and exemplary process 40 will proceed to step 4150 as described above.

The above-described exemplary method of providing a biased click distance value to all nodes on a web graph prevents a biased click distance value of a given target node from being changed if the biased click distance value is lower than the sum of a biased click distance value of a current node plus an edge value of the edge linking the target node to the current node.

Once all nodes of a given web graph have been determined and optionally downgraded (or optionally upgraded), if so desired, the biased click distance values for each document may be used as a parameter in a ranking function to provide a document relevance score for each document. Such a document relevance score may be used to rank search results of a search query. An exemplary method of ranking search results generating using a ranking function containing a biased click distance value parameter is shown in FIG. 6.

Figure 6:
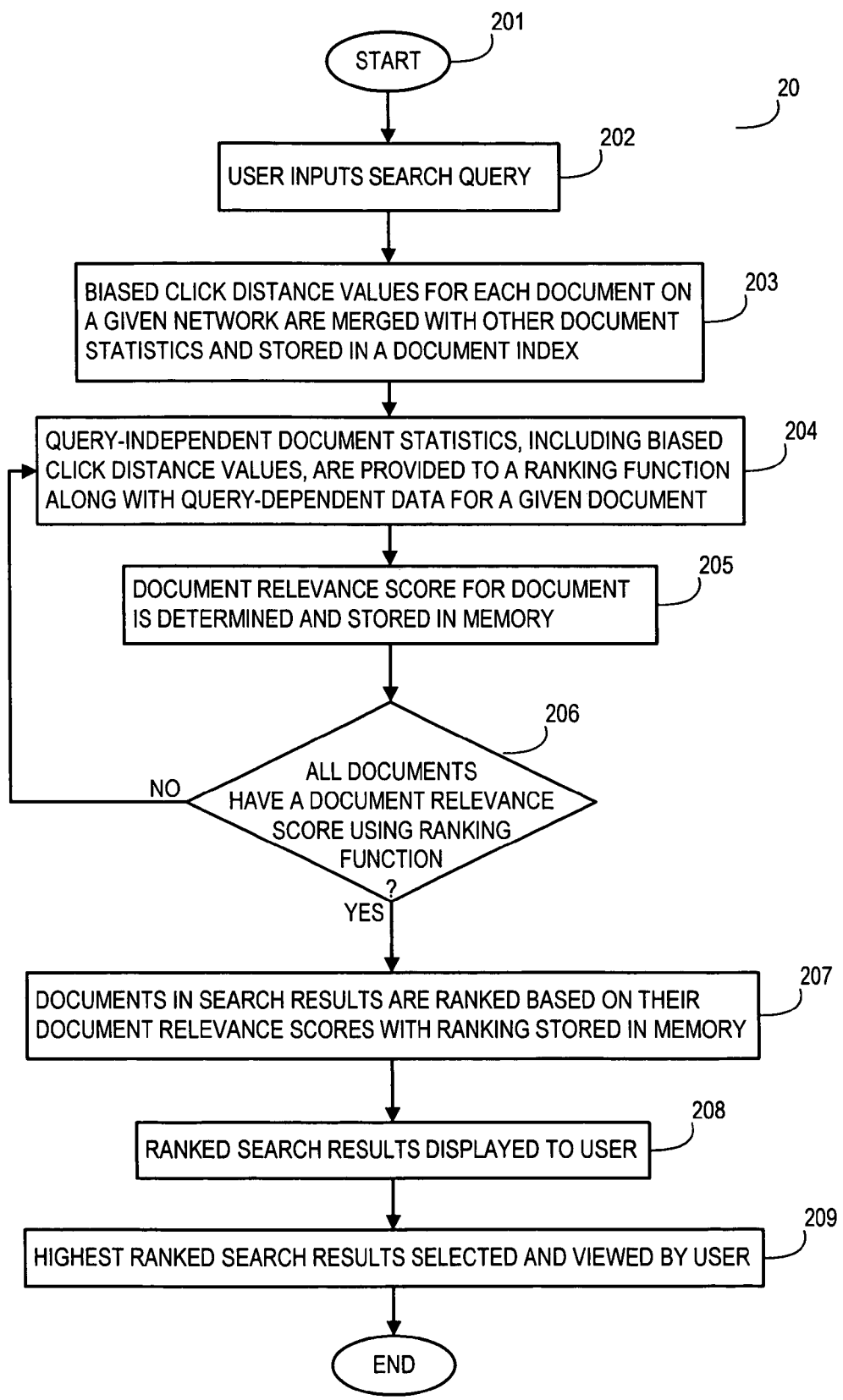
FIG. 6 represents a logic flow diagram showing exemplary steps in a method of ranking search results generating using a ranking function containing a biased click distance value parameter.

FIG. 6 provides a logic flow diagram showing exemplary steps in exemplary method 20, wherein exemplary method 20 comprises a method of ranking search results generating using a ranking function containing a biased click distance value parameter. As shown in FIG. 6, exemplary method 20 starts at block 201 and proceeds to step 202. In step 202, a user requests a search by inputting a search query. Prior to step 202, biased click distance values for each of the documents on the network have previously been calculated. From step 202, exemplary method 20 proceeds to step 203.

In step 203, the biased click distance value for each document on a network is merged with any other document statistics (e.g., query-independent statistics) for each document stored in the index. Merging the biased click distance values with other document statistics allows for a faster query response time since all the information related to ranking is clustered together. Accordingly, each document listed in the index has an associated biased click distance value after the merge. Once the merge is complete, exemplary method 20 proceeds to step 204.

In step 204, query-independent document statistics for a given document, including a biased click distance value, are provided as a component of a ranking function. Query-dependent data is also provided for the given document, typically as a separate component of the ranking function. The query-dependent data or content-related portion of the ranking function depends on the actual search terms and the content of the given document.

In one embodiment, the ranking function comprises a sum of at least one query-dependent (QD) component and at least one query-independent (QID) component, such as $$\text{Score} = QD(\text{doc}, \text{query}) + QID(\text{doc}).$$

The QD component can be any document scoring function. In one embodiment, the QD component corresponds to a field weighted scoring function described in U.S. patent application Ser. No. 10/804,326 entitled "FIELD WEIGHTING IN TEXT DOCUMENT SEARCHING," filed on Mar. 18, 2004, the subject matter of which is hereby incorporated in its entirety by reference. As provided in U.S. patent application Ser. No. 10/804,326, one equation that may be used as a representation of the field weighted scoring function is as follows:

$$QD(doc, \text{query}) = \sum \frac{wtf(k_1 + 1)}{k_1 + wtf} \times \log\left(\frac{N}{n}\right)$$

wherein:

wtf represents a weighted term frequency or sum of term frequencies of given terms in the search query multiplied by weights across all fields (e.g., the title, the body, etc.

of the document) and normalized according to the length of each field and the corresponding average length, N represents a number of documents on the network, n represents a number of documents containing a query term, and $k_1$, is a tunable constant.

The above terms and equation are further described in detail in U.S. patent application Ser. No. 10/804,326, the subject matter of which is hereby incorporated in its entirety by reference.

The QID component can be any transformation of a biased click distance value and other document statistic (such as a URL depth) for a given document. In one embodiment, the QID component comprises a function as follows:

$$QID(doc) = w_{cd} \frac{k_{cd}}{k_{cd} + \frac{b_{cd}\frac{CD}{k_{ew}} + b_{ud}UD}{b_{cd} + b_{ud}}}$$

wherein:

$W_{cd}$ represents a weight of a query-independent component such as a component containing a biased click distance parameter, $b_{cd}$ represents a weight of a biased click distance relative to the URL depth, $b_{ud}$ represents a weight of a URL depth, CD represents a computed click distance or assigned biased click distance for a document, $k_{ew}$ represents a tuning constant that is determined by optimizing the precision of the ranking function, similar to other tuning parameters (i.e., $k_{ew}$ may represent the edge weight value when all edges have the same edge weight value, or $k_{ew}$ may represent the average or mean edge weight value when edge weight values differ from one another), UD represents a URL depth, and $k_{cd}$ is the biased click distance saturation constant.

The weighted terms ($W_{cd}$, $b_{cd}$, and $b_{ud}$) assist in defining the importance of each of their related terms (i.e., the component containing a biased click distance parameter, the biased click distance value for a given document, and the URL depth of the given document respectively) and ultimately the outcome of the scoring functions.

The URL depth (UD) is an optional addition to the above-referenced query-independent component to smooth the effect that the biased click distance value may have on the scoring function. For example, in some cases, a document that is not very important (i.e., has a large URL depth) may have a short biased click distance value. The URL depth is represented by the number of slashes in a document's URL. For example, www.example.com\d1\d2\d3\d4.htm includes four slashes and would therefore have a URL depth of 4. This document however, may have a link directly from the main page www.example.com giving it a relatively low biased click distance value. Including the URL depth term in the above-referenced function and weighting the URL depth term against the biased click distance value compensates for a relatively high biased click distance value to more accurately reflect the document's importance within the network. Depending on the network, a URL depth of 3 or more may be considered a deep link.

In one embodiment, the ranking function used to determine a document relevance score for a given document comprises a function as follows:

$$Score = \sum \frac{wtf'(k_1 + 1)}{k_1 + wtf'} \times \log\left(\frac{N}{n}\right) + w_{cd} \frac{k_{cd}}{k_{cd} + \frac{b_{cd}\frac{CD}{k_{ew}} + b_{ud}UD}{b_{cd} + b_{ud}}}$$

wherein the terms are as described above.

In other embodiments, the URL depth may be removed from the ranking function or other components may be added to the ranking function to improve the accuracy of the query-dependent component, the query-independent component, or both. Furthermore, the above-described query-independent component containing a biased click distance parameter may be incorporated into other ranking functions (not shown) to improve ranking of search results.

Once document statistics for a given document are provided to a ranking function in step 204, exemplary method 20 proceeds to step 205. In step 205, a document relevance score is determined for a given document, stored in memory, and associated with the given document. From step 205, exemplary method 20 proceeds to decision block 206.

At decision block 206, a determination is made by application code whether a document relevance score has been calculated for each document within a network. If a determination is made that a document relevance score has not been calculated for each document within a network, exemplary method 20 returns to step 204 and continues as described above. If a determination is made that a document relevance score has been calculated for each document within a network, exemplary method 20 proceeds to step 207.

In step 207, the search results of the query comprising numerous documents are ranked according to their associated document relevance scores. The resulting document relevance scores take into account the biased click distance value of each of the documents within the network. Once the search results are ranked, exemplary method 20 proceeds to step 208 where ranked results are displayed to a user. From step 208, exemplary method 20 proceeds to step 209 where highest ranked results are selected and viewed by the user. From step 209, exemplary method 20 proceeds to step 210 where exemplary method 20 ends.

In addition to the above-described methods of generating a document relevance score for documents within a network and using document relevance scores to rank search results of a search query, computer readable medium having stored thereon computer-executable instructions for performing the above-described methods are also disclosed herein.

Computing systems are also disclosed herein. An exemplary computing system contains at least one application module usable on the computing system, wherein the at least one application module comprises application code loaded thereon, wherein the application code performs a method of generating a document relevance score for documents within a network. The application code may be loaded onto the computing system using any of the above-described computer readable medium having thereon computer-executable instructions for generating a document relevance score for documents within a network and using document relevance scores to rank search results of a search query as described above.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the disclosed methods, computer readable medium, and computing systems should be assessed as that of the appended claims and any equivalents thereto.

What is claimed is:

1. A computer readable storage medium having stored thereon computer-executable instructions for ranking a plurality of documents in a network, wherein said computer-executable instructions when executed by the computer perform a method of generating search results in response to a search query, the method comprising:

storing document information in memory, the document information identifying the plurality of documents in the network, the plurality of documents including authoritative documents and non-authoritative documents, the authoritative documents including at least a first authoritative document and a second authoritative document, and the non-authoritative documents including at least a first non-authoritative document;

storing link information in the memory, the link information identifying links among the plurality of documents;

computing click distance values for each of the non-authoritative documents to the authoritative documents, the click distance values including at least a first click distance value that is a function of a number of links that need to be followed to create a path from the first non-authoritative document to the first authoritative document and a second click distance value that is a function of a number of links that need to be followed to create a path from the first non-authoritative document to the second authoritative document;

computing biased click distance values for each of the non-authoritative documents in the network to the authoritative documents, wherein the biased click distance values include at least a first biased click distance value that is a function of a lesser of the first and second click distances;

receiving the search query including at least one search term;

executing the search query to generate a list of the plurality of documents that include the at least one search term, the list of the plurality of documents including an identifier of the first non-authoritative document;

ranking the list of the plurality of documents that include the at least one search term using a ranking function that comprises one or more query-independent components, wherein at least one query-independent component includes a biased click distance parameter that takes into account the biased click distance values, including the first biased click distance value; and outputting the ranked search results according to the ranking.

2. The computer readable storage medium of claim 1, wherein the method further comprises assigning assigned biased click distance values to the authoritative documents.

3. The computer readable storage medium of claim 2, wherein at least two of the assigned biased click distance values differ from one another.

4. The computer readable storage medium of claim 1, wherein the ranking function further comprises at least a second query-independent component that includes an edge value parameter that takes into account edge values of each edge in the network, wherein one or more edge values are a number other than 1.

5. The computer readable storage medium of claim 4, wherein the edge values are equal to one another and are equal to a number other than 1.

6. The computer readable storage medium of claim 4, wherein the edge values are equal to one another and are equal to or greater than a highest biased click distance value initially assigned to one or more of the authoritative documents.

7. The computer readable storage medium of claim 1, further comprising computer-executable instructions for assigning a score generated by the ranking function to each document in the network, said score being used to rank documents in ascending or descending order.

8. The computer readable storage medium of claim 7, wherein the score for each document is generated using a formula:

$$\text{Score} = \sum \frac{wtf'(k_1+1)}{k_1 + wtf'} \times \log\left(\frac{N}{n}\right) + w_{cd} \frac{k_{cd}}{k_{cd} + \frac{b_{cd}\frac{CD}{k_{ew}} + b_{ud}UD}{b_{cd}+b_{ud}}}$$

wherein:
wtf' represents a weighted term frequency,
N represents a number of the documents in the network,
n represents a number of the documents containing the search term,
$W_{cd}$ represents a weight of the at least one query-independent component,
$b_{cd}$ represents a weight of one of the click distance values,
$b_{ud}$ represents a weight of a URL depth,
CD represents one of the computed click distance values or an assigned biased click distance for a document,
$k_{ew}$ represents a tuning constant related to edge weights,
UD represents the URL depth, and
$k_{cd}$ and $k_1$ are constants.

9. A method of determining document relevance scores for documents in a network, said method comprising the steps of:

storing document and link information for the documents in the network;

generating a representation of the network from the document and link information, wherein the representation of the network includes nodes that represent the documents and edges that represent the links;

assigning a biased click distance value to at least two authoritative nodes in the network, wherein the at least two authoritative nodes include at least a first authoritative node having a first assigned biased click distance and a second authoritative node having a second assigned biased click distance;

computing click distances for each non-authoritative node in the representation of the network to at least two of the authoritative nodes, wherein the click distances include a first click distance and a second click distance, the first click distance being a function of a number of the links that need to be followed to create a path from a first non-authoritative node to the first authoritative node, and the second click distance being a function of a number of the links that need to be followed to create a path from the first non-authoritative node to the second authoritative node;

computing biased click distance values for each of the non-authoritative documents, wherein the biased click distance values include at least a first biased click distance value that is a function of a lesser of the first and second click distances; and using the biased click distance values to determine document relevance scores for each of the documents in the network.

10. The method of claim 9, wherein the first assigned biased click distance and the second assigned biased click distance differ from one another.

11. The method of claim 9, further comprising the step of: assigning to each edge in the representation of the network an edge value, wherein the edge values are equal to or greater than 1.

12. The method of claim 11, wherein each edge value is greater than a highest biased click distance value assigned to any of the authoritative nodes.

13. The method of claim 9, wherein the document relevance score for each document on the network is generated using a formula:

$$\text{Score} = \sum \frac{wtf'(k_1 + 1)}{k_1 + wtf'} \times \log\left(\frac{N}{n}\right) + w_{cd} \frac{k_{cd}}{k_{cd} + \frac{b_{cd}\frac{CD}{k_{ew}} + b_{ud}UD}{b_{cd} + b_{ud}}}$$

wherein:
wtf' represents a weighted term frequency,
N represents a number of the documents in the network,
n represents a number of the documents containing a query term,
$W_{cd}$ represents a weight of a query-independent component,
$b_{cd}$ represents a weight of one of the click distances,
$b_{ud}$ represents a weight of a URL depth,
CD represents one of the computed click distances or one of the assigned biased click distances,
$k_{ew}$ represents a tuning constant related to edge weights,
UD represents the URL depth, and
$k_{cd}$ and $k_1$ are constants.

14. A computing system comprising:
a processor; and
a memory, the memory storing computer-executable instructions which when executed by the processor perform a method of determining document relevance scores for nodes in a network, said method comprising the steps of:
assigning biased click distance values to at least two authoritative nodes in a representation of the network, wherein the at least two authoritative nodes include at least a first authoritative node having a first assigned biased click distance and a second authoritative node having a second assigned click distance;
computing click distances for each non-authoritative node in the representation of the network to at least two of the authoritative nodes, wherein the click distances include a first click distance and a second click distance, the first click distance being a function of a number of links that need to be followed to create a path from a first non-authoritative node to the first authoritative node, and the second click distance being a function of a number of the links that need to be followed to create a path from the first non-authoritative node to the second authoritative node;
computing biased click distance values for the non-authoritative nodes, wherein the biased click distance values include at least a first biased click distance value that is a function of a lesser of the first and second click distances; and
using the biased click distance values to determine document relevance scores for each of the nodes in the network.

* * * * *